US 6,626,490 B2

(12) United States Patent
Williams et al.

(10) Patent No.: US 6,626,490 B2
(45) Date of Patent: Sep. 30, 2003

(54) QUICK-MOUNT & PIVOT BASE FOR BICYCLE SEAT OR THE LIKE

(75) Inventors: Thomas D. Williams, San Diego, CA (US); Steven M. Gootter, Scottsdale, AZ (US)

(73) Assignee: G & W Products, Inc., Encinitas, CA (US)

( * ) Notice: Subject to any disclaimer, the term of this patent is extended or adjusted under 35 U.S.C. 154(b) by 0 days.

(21) Appl. No.: 09/954,572

(22) Filed: Sep. 14, 2001

(65) Prior Publication Data

US 2002/0053818 A1 May 9, 2002

Related U.S. Application Data

(63) Continuation-in-part of application No. 09/668,042, filed on Sep. 21, 2000.

(51) Int. Cl.[7] .................................................. B62J 1/00
(52) U.S. Cl. ........................... 297/215.15; 297/195.1; 297/209; 297/210; 297/213
(58) Field of Search ............................ 297/209, 210, 297/213, 215.15, 195.1, 314

(56) References Cited

U.S. PATENT DOCUMENTS

| 357,059 A | * | 2/1887 | Banks | 297/314 |
|---|---|---|---|---|
| 468,398 A | * | 2/1892 | Sherman | 297/213 |
| 507,514 A | * | 10/1893 | Warwick | 297/204 |
| 1,232,165 A | * | 7/1917 | Aller | 297/209 |
| 2,519,163 A | * | 8/1950 | Turner | 248/292.12 |
| 2,707,986 A | * | 5/1955 | Johnson | 248/583 |
| 3,302,970 A | * | 2/1967 | Rizzato | 297/215.15 |
| 4,141,587 A | * | 2/1979 | Holcomb | 297/215.1 |
| 4,275,922 A | * | 6/1981 | Juy | 297/215.14 |
| 5,007,675 A | * | 4/1991 | Musto et al. | 297/215.14 |
| 5,044,592 A | * | 9/1991 | Cienfegos | 248/408 |
| 5,048,891 A | * | 9/1991 | Yach | 297/215.14 |
| 5,228,796 A | * | 7/1993 | Kao | 403/84 |
| 5,664,829 A | * | 9/1997 | Thomson et al. | 297/215.14 |
| 5,749,622 A | * | 5/1998 | Tseng | 370/337 |
| 5,915,784 A | * | 6/1999 | Clark | 297/215.15 |
| 6,019,422 A | * | 2/2000 | Taormino et al. | 297/195.1 |
| 6,213,553 B1 | * | 4/2001 | Fitz | 297/314 |

FOREIGN PATENT DOCUMENTS

GB 2184698 A * 7/1987

* cited by examiner

Primary Examiner—Peter M. Cuomo
Assistant Examiner—Joe Edell
(74) Attorney, Agent, or Firm—Duckor Spradling & Metzger; Bernard L. Kleinke (57) ABSTRACT

A seat support platform is pivotally supported on a base member. A rotatable locking element is provided on the platform to selectively lock frame members of a saddle thereonto. A clamp rigidly connects the base with a support frame/chassis such as that of a stationary bicycle or the like. The clamp has upper and lower halves which are forced together by a cam lever arrangement.

14 Claims, 12 Drawing Sheets

QUICK-MOUNT & PIVOT BASE FOR BICYCLE SEAT OR THE LIKE

RELATED APPLICATIONS

This is a continuation-in-part of U.S. patent application Ser. No. 09/668,042, filed Sep. 21, 2000, titled "QUICK-MOUNT & PIVOT BASE FOR BICYCLE SEAT OR THE LIKE."

BACKGROUND OF THE INVENTION

1. Field of the Invention

The present invention relates generally to seat mounting arrangement and more specifically to a quick-action mount arrangement which permits seats/saddles to be switched from one to another with the minimum of trouble and effort.

2. Related Art

With stationary exercise bikes such as those found in gymnasiums, a problem has been encountered in that the very exercise that the machines are designed to produce, leads to the drawback that the person by exercising, sweats, usually profusely. This leads to the situation wherein in the event that a number of different people use the same machine, the saddle or seat of that machine tends to become contaminated with sweat and/or bacteria contained in the sweat, and thus can lead to a possible hygiene problem as time passes by and different people continue to use the same machine.

One method of overcoming this is to provide the seat with a removable washable/disposable cover. However, such covers apt to slip about, as they stretch and/or otherwise deform with the passing of time. Another method is to change the seat each time a different person wishes to exercise. However, this usually involves the use of a spanner to release a nut and to allow the seat to switched out. The loss of the spanner, of course is apt to occur, thus leading to frustration and annoyance especially when the user has his or her own saddle which is particularly adapted to the person's physique, shape/preference.

SUMMARY OF THE INVENTION

The present invention is directed to solving the problem alluded to above, by providing an arrangement which permits seats to be quickly and easily unlocked, removed and replaced with another, and then permits the new seat to be quickly and easily locked in position ready for use. In addition to this quick and easy switching of seats, the invention further features a quick and easy orientation adjustment (e.g. pitch adjustment) which allows the angle of the saddle to be adjusted to an angle with respect to the floor/bike which is preferred by the user.

Yet another feature of the invention resides in an arrangement which resiliently supports the saddle or seat mounting arrangement and allows both the mount and the saddle to rock from side to side in a manner which emulates given types of riding style.

In brief, the above features are achieved by an embodiment wherein a seat support platform is provided with recesses that are adapted to receive elongate members which form part of most commonly used saddle chassis/frames and which extend along the bottom thereof. Once placed in these recesses, the elongate members can be locked in position using a rotatable locking element.

In addition to the above, the platform is pivotally supported on shafts or pivots and resiliently connected to a base member through a plurality of springs or the like type of resilient biasing elements. These spring are selected to produce sufficient bias/resistance to limit the amount of rocking motion the seat may undergo to a suitable narrow angle.

The base member, in this embodiment, is provided with clamp members which have arcuate surfaces that are provided with splines, teeth, knurling or the like, and which can be selectively forced into locking engagement through the use of a suitable lever operated device. In the disclosed embodiment, this lever operated device takes the form of a "cam" lever which is provided with a cam surface that causes the arcuate surfaces to assume a locking or clamped engagement when it is rotated to a locking position. When rotated away from this position, sufficient play is permitted between the surfaces of the clamp members to permit manual manipulation of the relative positions of the surfaces and thus allow the angle of the base member with respect to a device (e.g. a stationary bicycle) to be adjusted to a desired orientation.

More specifically, a first aspect of the present invention resides in a quick release/connection arrangement for a seat, comprising: a seat receiving structure having recessed portions adapted to receive a pair of elongate members which form part of a frame of the seat; a lever operated rotatable locking element is rotatably supported on the seat structure receiving member and selectively rotatable between a first position wherein engagement with the elongate members is absent and wherein the pair of elongate members are removable from the seat structure receiving member, and a second position wherein elongate members are engaged and locked in position on the seat structure receiving member.

This arrangement can further comprise: a base member on which the seat receiving structure is pivotally supported; and a resilient biasing arrangement which operatively interconnects the seat receiving structure with the base member and which biases the seat receiving structure to normally assume a predetermined orientation with respect to the base member.

Additionally, this arrangement can further include a clamp operatively interconnecting the base member and a chassis of a device, the clamp comprising: a first clamp member which is rigidly connected to the base member and a second clamp member which is rigidly connected with the chassis, a cam arrangement for normally forcing the first and second clamp members into locking engagement with each other and for selectively permitting sufficient play between the first and second clamp members to allow the relative movement therebetween.

This cam arrangement can comprises a lever which is rotatably supported on a shaft that is disposed through apertures respectively formed the first and second clamp members and which is operatively connected with the first clamp member. The lever in this case having a cam surface formed thereon proximate an axis about which the lever is rotatable with respect to the shaft. This cam surface is engageable with a surface which is stationary with respect to the second clamp member to produces a reaction which forces the first and second clamp members together into locking engagement with one another.

The above-mentioned seat receiving structure can comprise a platform in which the recessed portions are formed, and in which detents are provided to resist movement of the elongate members of the seat frame out of the passage structures with a predetermined amount of force.

A second aspect of the present invention resides in a quick release/connection arrangement for a seat comprising: a seat receiving platform which is pivotally supported on a base member; a resilient biasing member operatively interconnecting the platform and the base member to permit a limited amount of pivotal movement of the platform with respect to the base member; and a lever operated locking element mounted on the platform which is movable between a first position wherein a seat can be readily removed from the platform, and a position wherein the seat is immovably locked onto the platform.

In addition to the above, this arrangement can include a lever operated clamp which interconnects the base member and a chassis of a device operated locking element which is movable between a first position wherein a seat can be readily removed from the platform, and a position wherein the seat is immovably locked onto the platform.

A third aspect of the invention resides in a quick release/connection arrangement for a seat comprising: a seat receiving platform which is pivotally supported on a base member; a lever operated locking element mounted on the platform and movable between a first position wherein a seat can be readily removed from the platform, and a second position wherein the seat is immovably locked onto the platform; and a lever operated clamp which interconnects the base member and a chassis of a device.

Similar to the above-mentioned arrangements, the lever operated clamp can comprise: first and second clamp elements which are respectively rigidly connected with a base member and a chassis of a device; a shaft which passes through one of the first and second clamp elements and which is engageable with another of the first and second clamp elements; a lever operatively engaged with the shaft and arranged to be movable to a clamp position wherein it applies a force to the shaft and forces the first and second clamp elements into locking engagement with one another.

In this arrangement, the lever is formed with a cam surface which engages a predetermined surface when the lever is rotated to the clamp position, and which, through the engagement, displaces the shaft and forces the first clamp element into engagement with the second clamp element.

BRIEF DESCRIPTION OF THE DRAWINGS

The various features and advantages of the present invention will become more clearly appreciated as a detailed description of the preferred embodiment is given with reference to the appended drawings in which;

FIG. 27b is a frontal view of the adjustment post member used in the pitch adjustment system of FIG. 27a;

FIG. 27c is a top view of the pitch adjustment system of FIG. 27a;

FIG. 30b is a top view of the adjustment member of FIG. 30a.

DETAILED DESCRIPTION OF THE PREFERRED EMBODIMENTS

FIGS. 1–11 show an embodiment of the invention. In this arrangement, a seat support platform 100 is pivotally supported on shafts which are disposed through apertures formed in vertically extending post members 202 that form part of a base member generally denoted by the numeral 200. The base member 200 includes a clamp arrangement 300 which rigidly interconnects the base member 200 with a support frame such as that of a stationary bicycle or the like. In this arrangement, the clamp arrangement 200 includes upper and lower members 302, 304 which are adjustable with respect to one another to permit the orientation of the seat support platform 100 to be adjusted with respect to the support frame.

Figure 1:
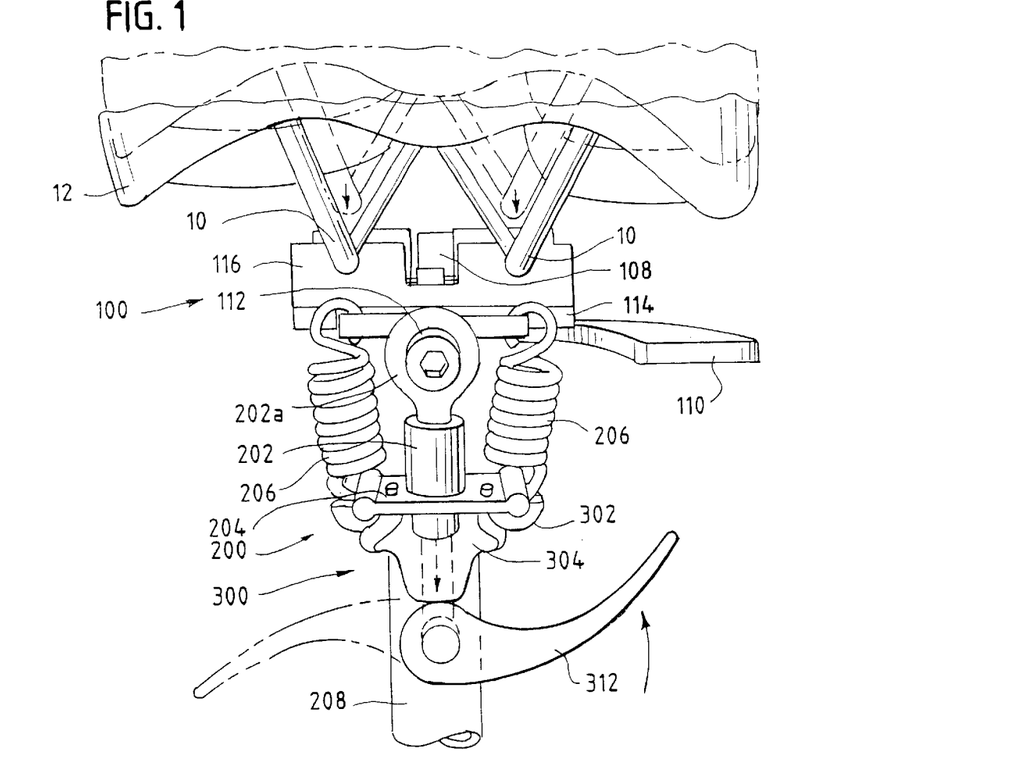
FIG. 1 is a rear view of an embodiment of the invention depicting the movement of an adjustment lever that enables quick unclamping and re-orientation of a seat support platform with respect to a frame such as that of a stationary exercise bicycle.
Figure 11:
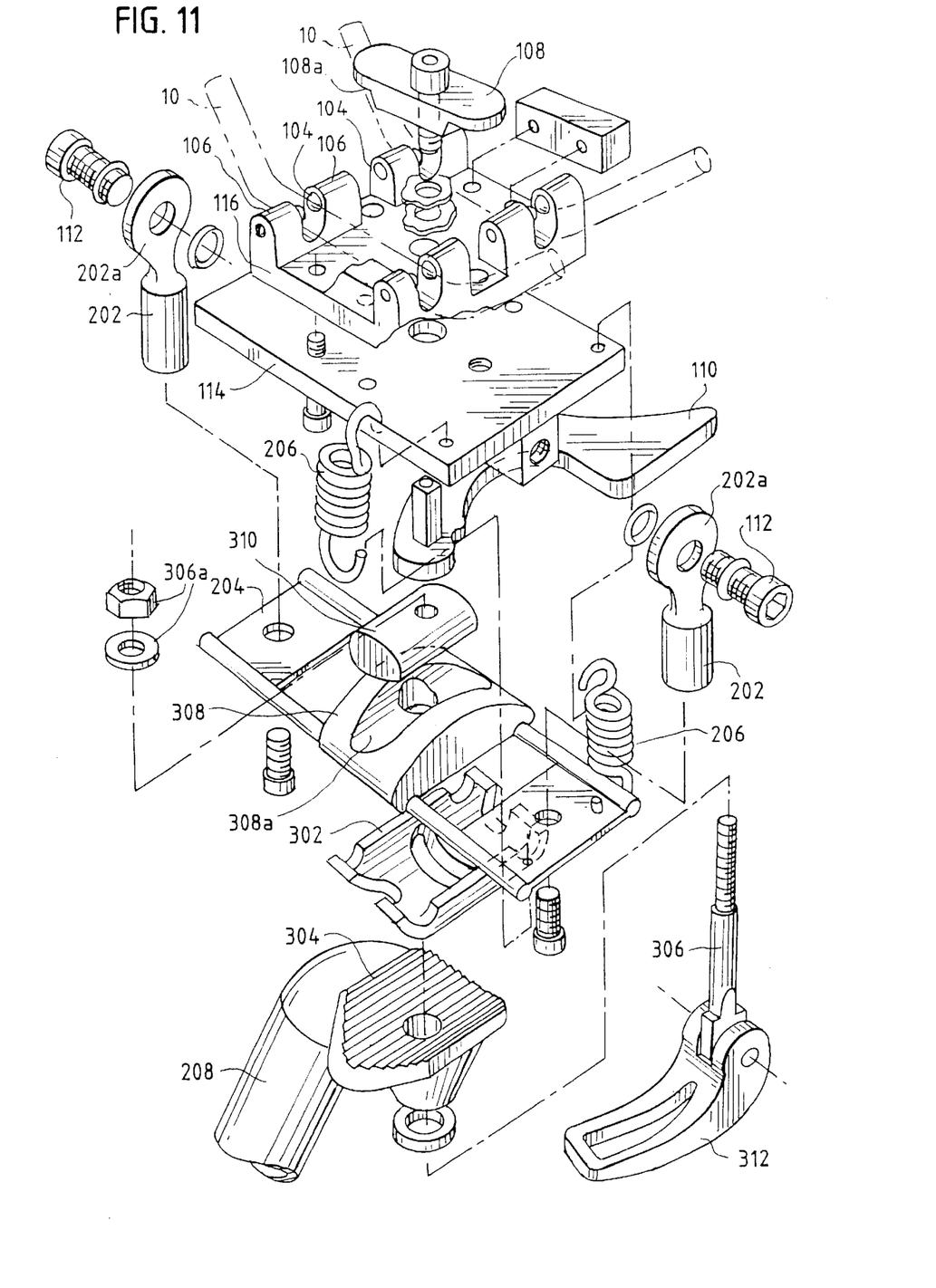
FIG. 11 is an exploded perspective view of the embodiment of the invention.

In more detail, the seat support platform 100 includes a structure which defines pairs of essentially parallel channels 102 that are adapted to receive essentially parallel portions 10 of a seat frame or chassis. These seat chassis/frame portions 10 are, as is conventional, formed of round spring steel stock or the like. Examples of such a structure are shown in U.S. Pat. No. 4,369,999 issued on Jan. 25, 1983 in the name of Kashima. The content of the document is hereby incorporated by reference.

In order to assist in maintaining a seat or saddle 12 in position once it is set on the platform 100, a plurality of detents 104 in the form of spring loaded dome-headed or caged ball bearing members, are disposed in pairs of opposed bores formed in crenellation-like projecting members 106 located on either side of the channels 102 in the illustrated manner. These detents 104 are arranged to project toward each other in pairs so as to engage the upper surface of the portions 10 of the seat frame once they are seated into the channels 102. The detents 104 retain the seat frame portions 10 in the channels 102 with a force selected to be easily overcome through the manual manipulation of the saddle 12. This retention is selected to ensure that the saddle 12, once disposed in position, remains there without any further particular intervention/care.

To rigidly lock the saddle 12 in position, a rotatable lock element 108 which shall be referred to as a 'lock-block', is rotatably supported on an upper surface of the platform 100 and connected to a lock lever 110 for synchronous movement therewith. This lock-block 108 is rotatable between a release position wherein it is essentially parallel with the seat frame members, and a locking position wherein it is rotated through 90° to a position wherein it engages at least part of the frame members 10 trapping the same in the channels 102. In this embodiment, the lock-block 108 is formed with curved recesses 108a at each end. These recess 108a are selected to match the curvature of the frame members 10 and to produce a snug locking engagement when the block 108 is rotated to the locking position via manual manipulation of the lock lever 110 from the position illustrated in FIG. 5 to that illustrated in FIG. 6.

As will be appreciated, the illustrated lock-block configuration enables a low platform profile. However, the present invention is not so limited and it is within the scope of the invention to use a differently shaped lock element if such is deemed preferable.

The platform 100 is pivotally supported on "pivot" bolts 112 which are threadedly received in boss or projection members (no numberal) forming part of a sub-plate member 114 that forms part of the platform 100 and which is securely bolted to the underside of an upper structural member 116 in which the channels 102 are formed. These bolts 112 passe through bores formed in circular bosses 202a at the tops of a pair of the post-like support members 202 which are bolted to a base platform 204 that forms a main portion of the base member. This base platform 204 is, in this instance, formed of a flat plate which has circular cross-section re-inforcing beads provided along each side.

A pair of coil springs (tension) 206 operatively interconnect the sub-plate member 114 of the platform 100 which is bolted to the lower side of the upper structural member 116 in which the channels 202 are defined, with the flat plate structure of the base platform 204. This arrangement is such as to permit the platform 100 to rock from side to side relative to the base member through the angle θ depicted in FIG. 2. This pivotal movement is such as to permit the saddle 12 to move in a manner enables the emulation of the side-to-side swaying motion of a bicycle under heavy peddling.

The lower portion of the base member 208 (best seen in FIG. 4) consists of a structure which is adapted to form part of, or be connected to, a support frame such as that of a stationary bicycle or the like. Although not specifically shown, this lower portion 208 can be provided with a structure that allows it to be clamped to the frame of the stationary bicycle or similar structure (not shown).

Figure 4:
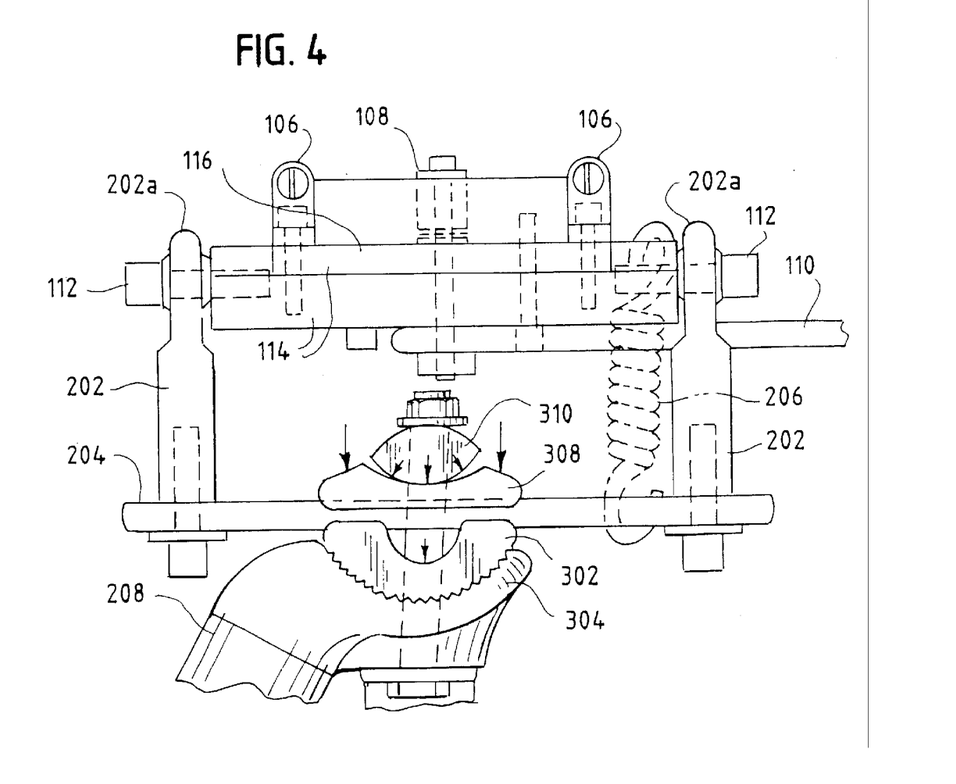
FIG. 4 is a side view showing details of the clamping arrangement which permits the orientation of the seat support platform with respect to the horizontal to be adjusted.

The clamp arrangement 300 which permits the adjustment of the pitch angle or orientation of the base 200 includes a) is such that the lower clamp member 304 has a curved concave surface provided with a plurality of straight teeth or splines 304a and is rigid with the lower portion 208, while the curved convex upper clamp member 302 which is provided with a plurality of corresponding teeth or splines 302a on its convexly curved surface. The upper and lower clamp members 302, 304 are arranged to engage one another and to be adjustably set in a number of different positions relative to one another. The upper clamp member 302 is held against a lower surface of the flat plate 204 by an arrangement which includes a clamp connection/tension bolt or shaft 306 which passes through apertures formed in both of the upper and lower clamp members 302, 304 and the flat plate 204. This clamp connection/tension bolt 306 also passes through apertures formed in arcuately shaped member 308 which is adapted to seat on the upper surface of the flat plate 204, and an elliptic prism-shaped member 310 which matingly seats in an arcuate groove 308a formed in the arcuately shaped member 308.

A nut and a washer 306a are provided at the upper end of the clamp connection/tension bolt 306 to provide a reaction arrangement. A cam lever 312, as it shall be referred to, is pivotally supported at the lower end of the bolt 306. The cam lever 312 is provided with a shoulder or cam surface 312a which projects in a manner wherein the lever 312, when rotated from a release position to a locking position, is such as to bring the shoulder or cam surface 312a into engagement with the lower surface of the lower clamp member 304 in a manner which draws the upper member 302 down into tight meshing engagement with the lower clamp member 300 thus eliminating any play which would permits the upper and lower clamp members 302, 304 to move relative to one another.

As will be appreciated from FIG. 11, this clamp arrangement is such as to allow the pitch of the saddle to be adjusted in accordance with the preference of the rider.

It will be understood that the invention is not limited to the clamp structure which is shown in the drawings and that modifications may be made thereto without departing from the scope of the invention. For example, alternative clamp elements/parts such as those described in U.S. Pat. No, 5,979,978 issued on Nov. 9, 1999, in the name of Olsen et al. may also be used is so desired. It will be noted, however, that it is advantageous that the cam lever at one end of the bolt, which is used to clamp the adjustment permitting arrangements together, be provided to enable quick and easy adjustment as one rider changes and another takes his or her place.

Figure 2:
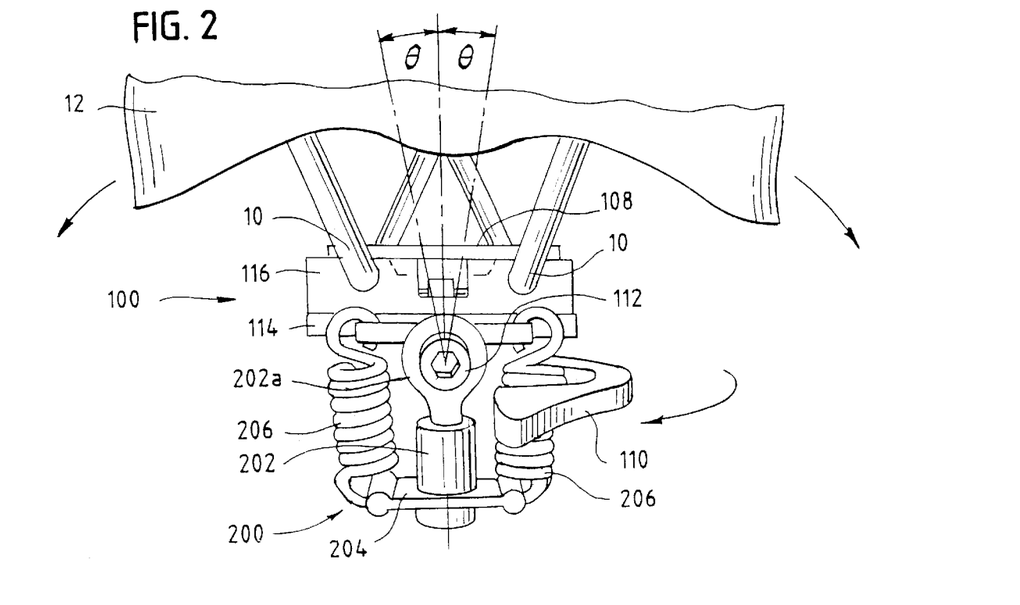
FIG. 2 is a view similar to that shown in FIG. 1, which depicts a release/clamp lever which is associated with a quick release/lock arrangement that enables a seat or saddle to be a swapped out, moved from an unlocked position illustrated in FIG. 1 to a locking position.
Figure 3:
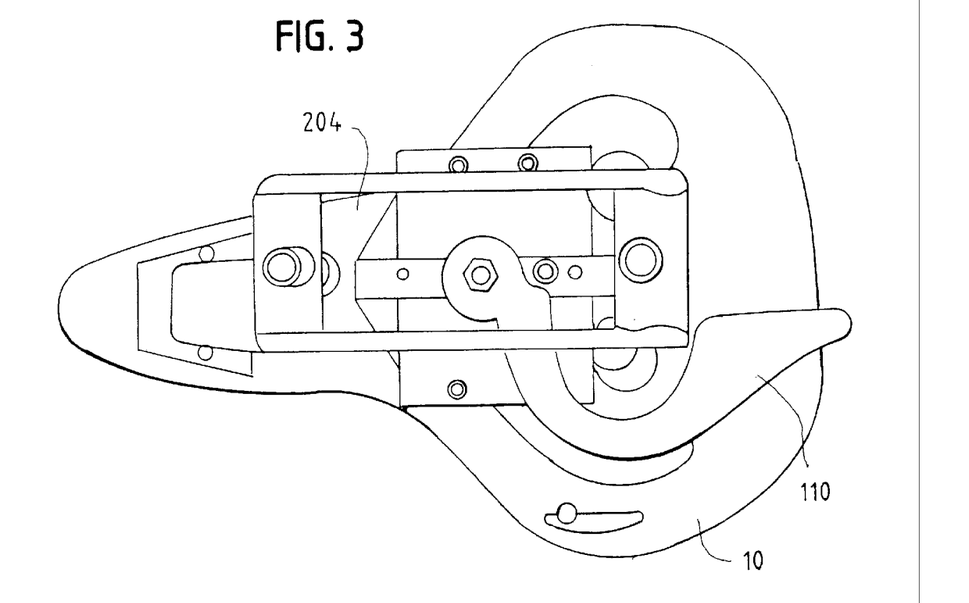
FIG. 3 is an underside view of a portion of the support platform which has been disconnected from the device frame so as to facilitate a ready understanding of the structure and arrangement of the release/clamp lever.
Figure 5:
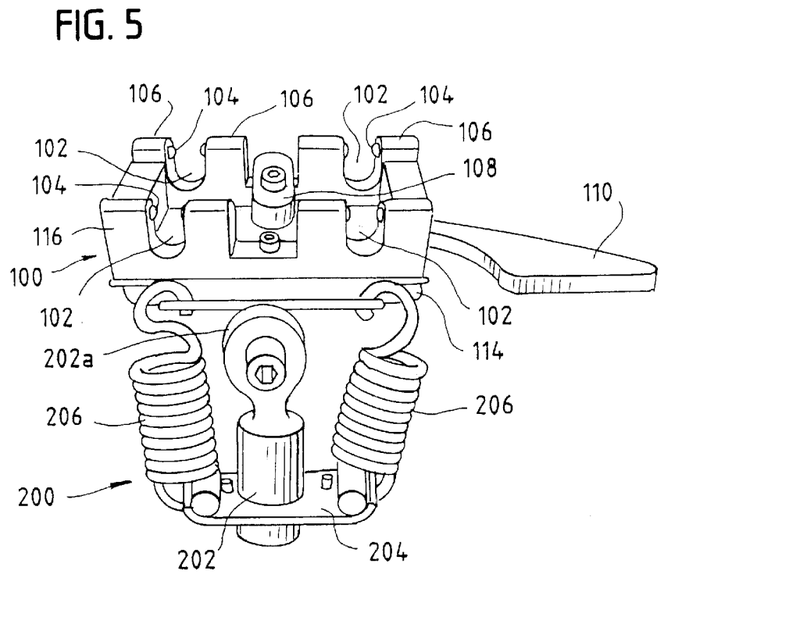
FIGS. 5 and 6 are perspective views which show a locking element, which is mounted on the seat support platform and forms a vital part of the quick release mechanism that enables the seat/saddle to be swapped out, in releasing and locking positions respectively.
Figure 6:
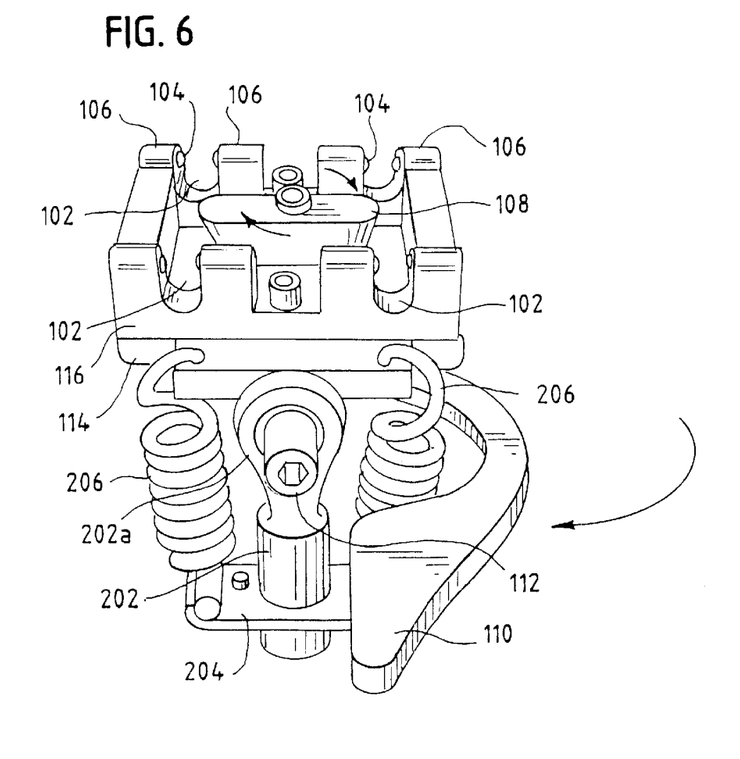
Figure 7:
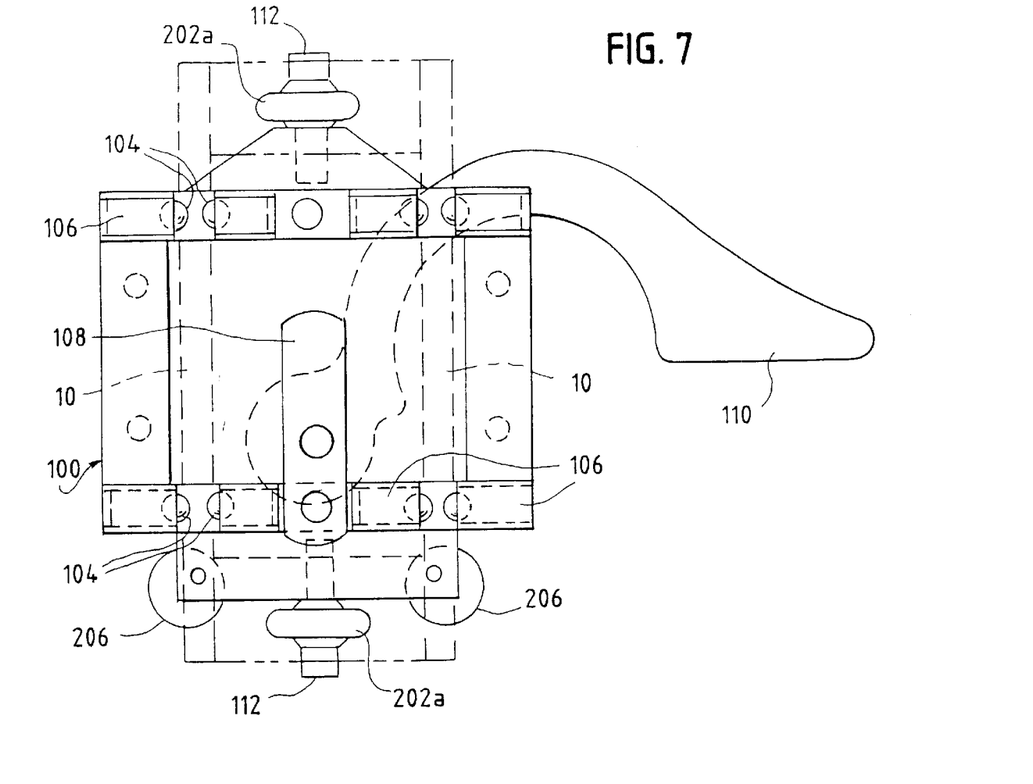
FIGS. 7 and 8 are respectively top plan and front end views of the seat support platform showing the locking element and associated release/clamp or locking lever in their respective unlocked positions.
Figure 8:
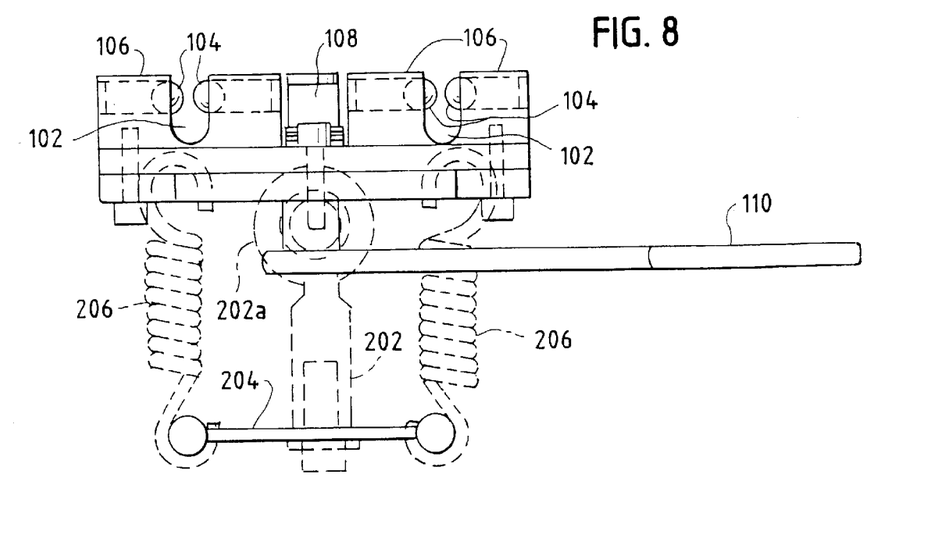
Figure 9:
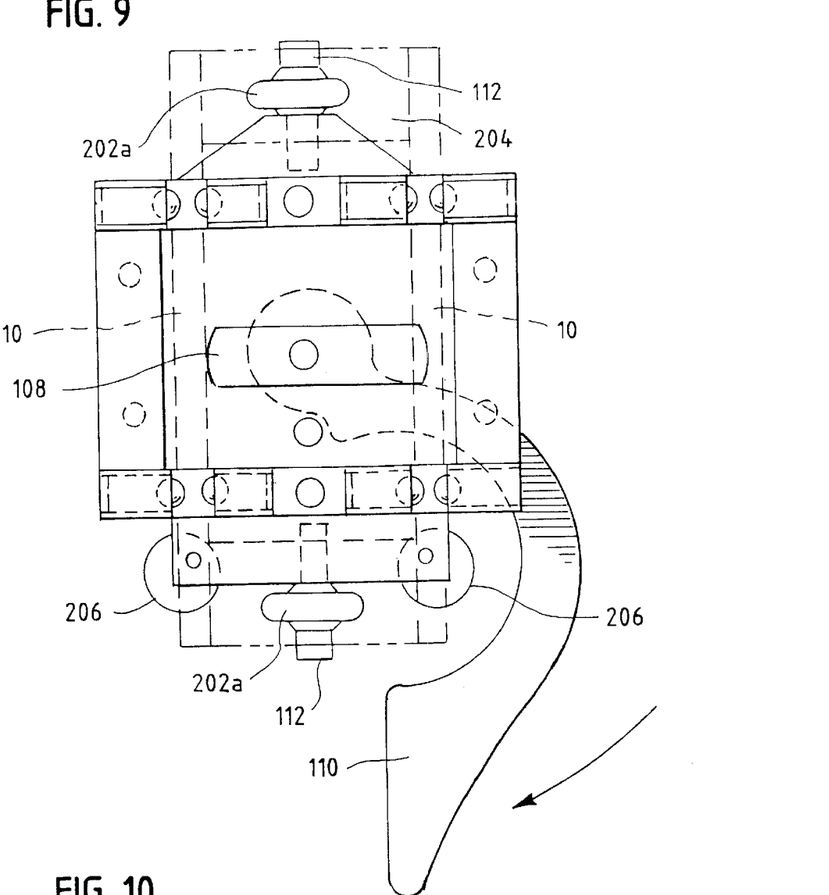
FIGS. 9 and 10 are respectively top plan and front end views of the seat support platform showing the locking element and associated release/clamp lever in their respective locked positions.
Figure 10:
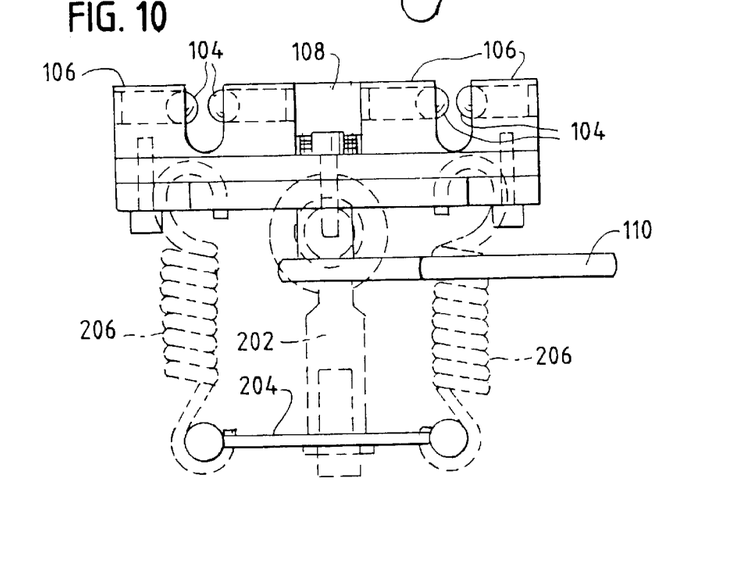

The operation of the above-described embodiment is such that when it is required to remove one saddle and replace it with another, the lock lever 110 is rotated form the position illustrated in FIGS. 2, 3 and 6 to that shown in FIGS. 5, 7 and 8. This rotates the lock-block 108 from the engaging locking position to the release position. Under these conditions, only the effect of the detents 104 resist removal of the seat frame portions 10 from the channels 102. A small force is sufficient to detach the saddle from its seated position. The new saddle or seat 12 may then be placed in position wherein the detents 104 will conveniently hold the saddle 12 in position until such time as the operator rotates the lock lever back 110 to its locking position whereby the lock-block 108 is brought into locking engagement with the upper surfaces of the saddle frame members 10.

Before mounting and using the newly placed saddle, it is possible for the user to adjust the pitch of the saddle 12 by rotating the cam lever 312 from the locking position shown in solid line in FIG. 1, to that shown in broken line. At this time, sufficient play is enabled between the upper and lower clamp members 302, 304 to permit disengagement of the teeth/splines and for the relative positions of the upper and lower members to be changed via manual manipulation of the saddle with respect to the bike frame, to achieve the desired angle. Rotation of the cam lever 312 back to its locking position forces the upper and lower clamp members 302, 304 back into slip-free engagement with one another and assures the rider that the saddle will remain in the selected position.

Upon mounting and using the stationary bike or the like type of device the new saddle or seat 12 has been connected to, the provision of the pivot bolts 112 and the springs 206 allow the seat support platform 100 and the attached saddle or seat 12 to rock from side to side in the manner depicted in FIG. 2 of the drawings. This provides the rider with the sensation of being on an actual bicycle wherein it leans from side to side as he or she makes powerful peddling strokes.

FIGS. 12 through 15 illustrate another embodiment of a seat platform according to the present invention. The seat platform 400 is similar to the seat platform 100 described above with reference to FIGS. 1 through 11 with certain differences discussed here in detail. The seat platform 400 illustrated in FIGS. 12 through 15 comprises a plate with a narrowed front portion 420. This narrowed front portion 420 allows the seat platform 400 to accommodate bike seats or saddles that may be narrow in the front as is commonly available. The narrowed front portion 420 prevents the seat platform 400 from causing discomfort to or interference with the user. The seat platform 400 has crennelation-like projecting members 406, 407 in the front and back of the seat platform 400. The front crennelation-like projecting members 406 and the rear crennelation-like projecting members 407 form parallel channels for accommodating the seat frame. The crennelation-like projecting members 406, 407 form detents 404 for partially locking the bike seat in place. In the embodiment illustrated in FIGS. 12 through 15, the detents 404 are formed on the outside of the back portion of the seat platform 400 with a spring-and-ball mechanism 424. On the inside of the back portion, a pin 428 is provided to form the detent 404. Thus, as the seat frame is inserted into the parallel channels, the ball in the spring-and-ball mechanism 424 recesses against the spring and returns to its protruding position once the bike seat has been inserted. In the front portion, the outside detent is eliminated and the inside detent 404 is formed with a pin 428 similar to that in the back portion. Combined with the outside crennelation-like projecting members 407, the pin 428 serves to temporarily retain the bike seat.

Figure 12:
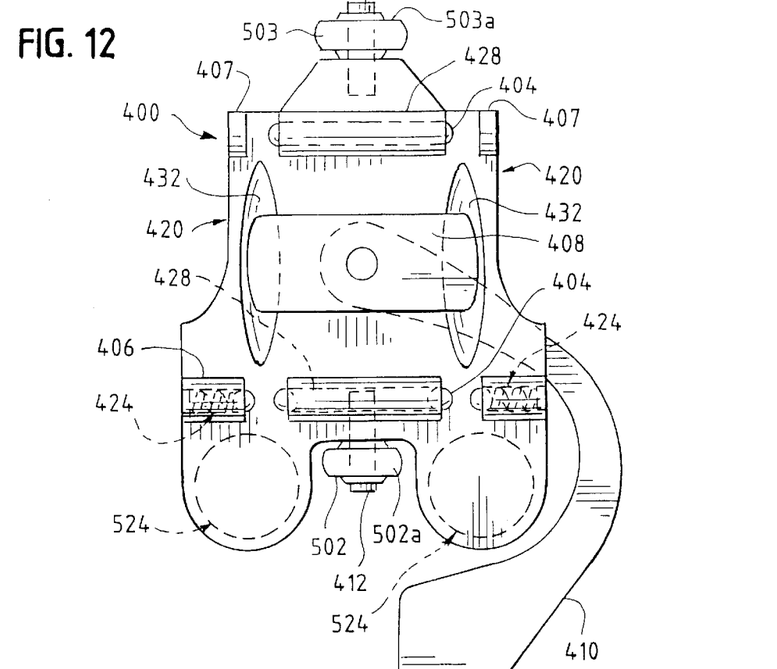
FIG. 12 is top view of a top portion of a seat support according to another embodiment of the invention.
Figure 13:
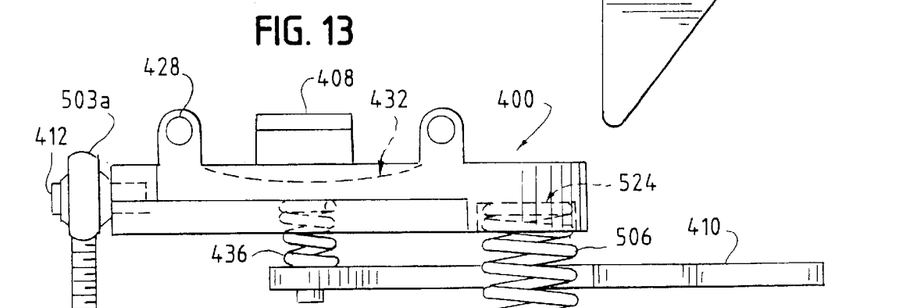
FIG. 13 is a side view of the top portion of the seat support of FIG. 12.
Figure 14:
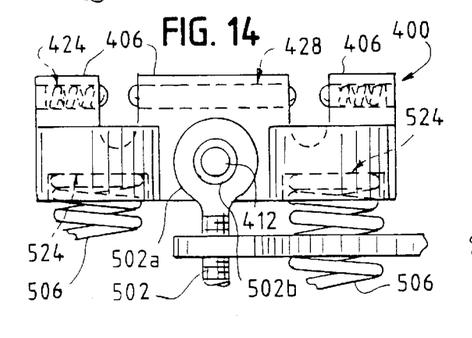
FIG. 14 is a back view of the top portion of the seat support of FIG. 12.
Figure 15:
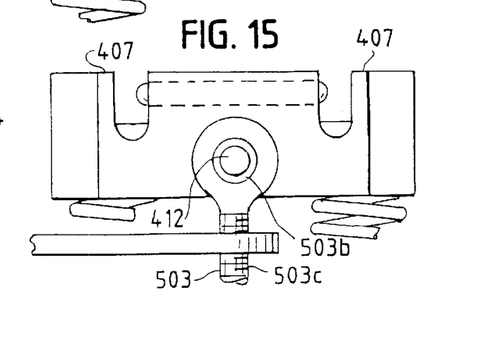
FIG. 15 is a front view of the top portion of the seat support of FIG. 12.
Figure 16:
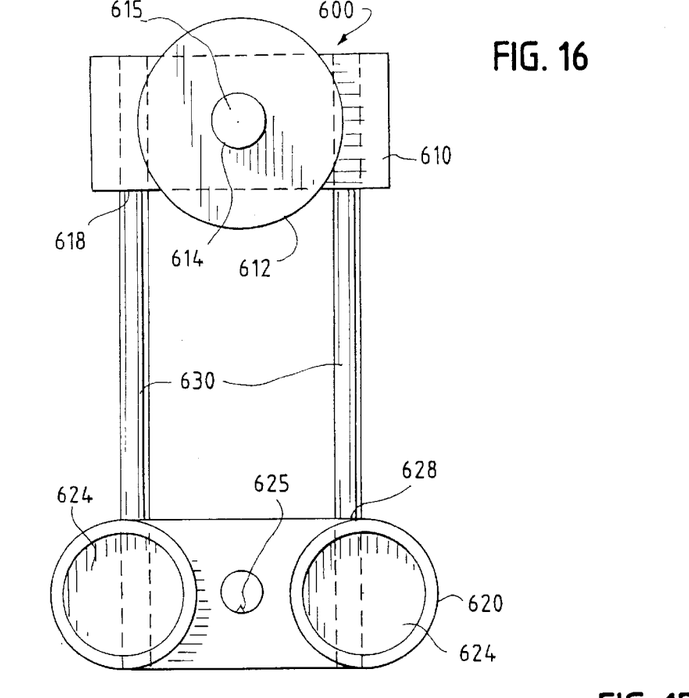
FIG. 16 is a top view of a bottom portion for use with the top portion of FIG. 12.

The seat platform 400 is provided with a pair of parallel, longitudinal grooves 432. The grooves 432 allow the seat platform 400 to accommodate the seat rails of a bike seat. The grooves 432 allow the seat rails to have a certain variation in the arch of the rails, thus not requiring the seat rails to be manufactured within extremely tight tolerances. Additionally, the grooves 432 allow the rails to flex within the grooves 432 when the latching mechanism is engaged, thereby providing a tight fit.

As with the seat platform described above in referenced FIGS. 1 through 11, the embodiment illustrated in FIGS. 12 through 15 also comprises a lock block 408 attached to a lock lever 410 for locking the seat to the seat platform 400. The embodiment illustrated in FIGS. 12 through 15, however, further comprises a compression spring 436 provided between the lock lever 410 and the lower surface of the seat platform 400, as most clearly seen in FIG. 13. The compression spring 436 allows the lock block 408 to rise on top of the bike seat rails as the lock lever is turned. Thus, in the locked position, the spring 436 provides an additional, downward locking force, causing the lock block 408 to be forced down onto the seat rails.

The seat platform 400 illustrated in FIGS. 12 through 15 is mounted to a base member (described below with reference to FIGS. 16 through 19) with two post members 502, 503. The rear post member 502 is mounted to the seat platform 400 in a manner similar to that described above with reference to FIGS. 1 through 11. The front and rear post members 502, 503 are connected to the seat platform 400 with a pivot bolt 412 extending through a circular boss 502a, 503a. In one embodiment, the circular boss 502a, 503a may comprise a ball joint 502b, 503b to which a pivot bolt 412 is connected. The ball joint 502b, 503b allows free rotational movement of the seat platform 400 relative to the post member 502, 503.

In the embodiment illustrated in FIGS. 12 through 15, the front post member 503 is provided with a threaded shaft 503c. As described below, the threaded shaft 503c allows the seat platform 400 to be tilted forward and rearward relative to a base member. This mechanism is described below with reference to FIGS. 16 through 19.

The seat platform 400 illustrated in FIGS. 12 through 15 is provided with recesses 524 on the underside of the seat platform 400. The recesses 524 are sized to accommodate compression springs 506 for allowing side to side motion, similar to springs 206 described above with reference to FIGS. 1 through 11. The compression springs 506 are retained within the recesses 524 and within similar recesses provided in the base member, as described below with reference to FIGS. 16 through 19.

FIGS. 16 through 19 illustrate a base member 600 for use with, for example, the seat platform 400 described above with reference to FIGS. 12 through 15. The base member 600 has a front portion 610 and a rear portion 620. The front portion 610 is provided with a tilt adjustment knob 612 for adjusting the tilt of the seat platform 400 with respect to the base member 600. The tilt adjustment knob 612 is connected to a threaded sleeve 614 extending through an opening 615 in the front portion 610. The sleeve 614 is internally threaded to engage a threaded shaft of the post member 503 described above with reference to FIGS. 12 through 15. As most clearly illustrated in FIGS. 17 and 18, the threaded sleeve 614 is retained within the opening 615 by a retaining ring 616 provided on the underside of the front portion 610. Thus, the tilt adjustment knob 612 is retained in a vertically-fixed position relative to the base member 600. The front portion 610 is also provided with bores 618 to accommodate rails 630.

Figure 17:
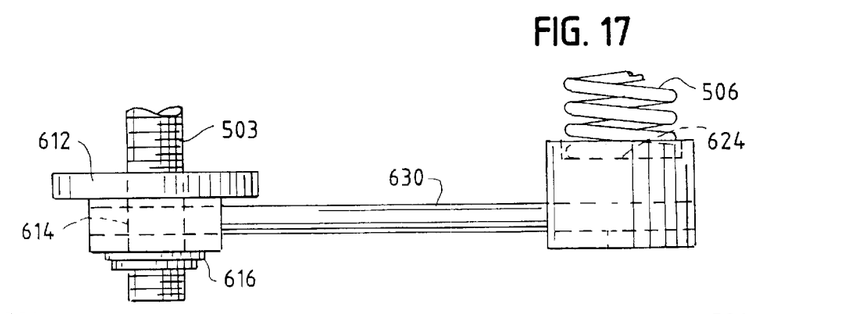
FIG. 17 is a side view of the bottom portion of FIG. 16.
Figure 18:
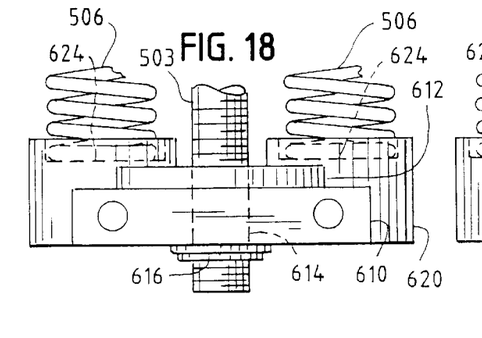
FIG. 18 is a front view of the bottom portion of FIG. 16.
Figure 19:
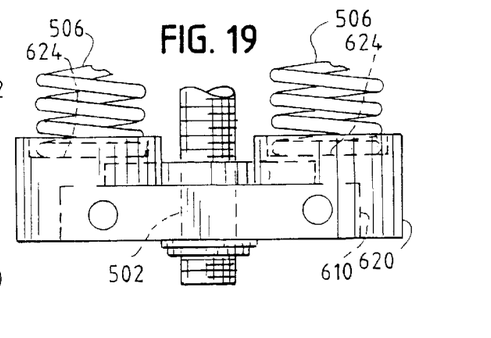
FIG. 19 is a back view of the bottom portion of FIG. 16.

The rear portion 620 is provided with recesses 624 similar to recesses 524 provided on the seat platform 400 described above with reference to FIGS. 12 through 15. The recesses 624 in the rear portion 620 are sized to accommodate compression springs 506, as illustrated in FIGS. 17 through 19. The rear portion 620 is also provided with an opening 625 to accommodate a post member, such as post member 502, as most clearly shown in FIG. 19. Rear portion 620 is also provided with bores 628 for accommodating the rails 630.

Rails 630 are sized and positioned to fit into a mounting on a bicycle, such as an exercise bike. In one embodiment, the size and positioning of the rails coincide with the size and positioning of the parallel channels in the seat platform 400 described above. Thus, a modular system of seat supports and seats may be provided.

Figures 20, 21:
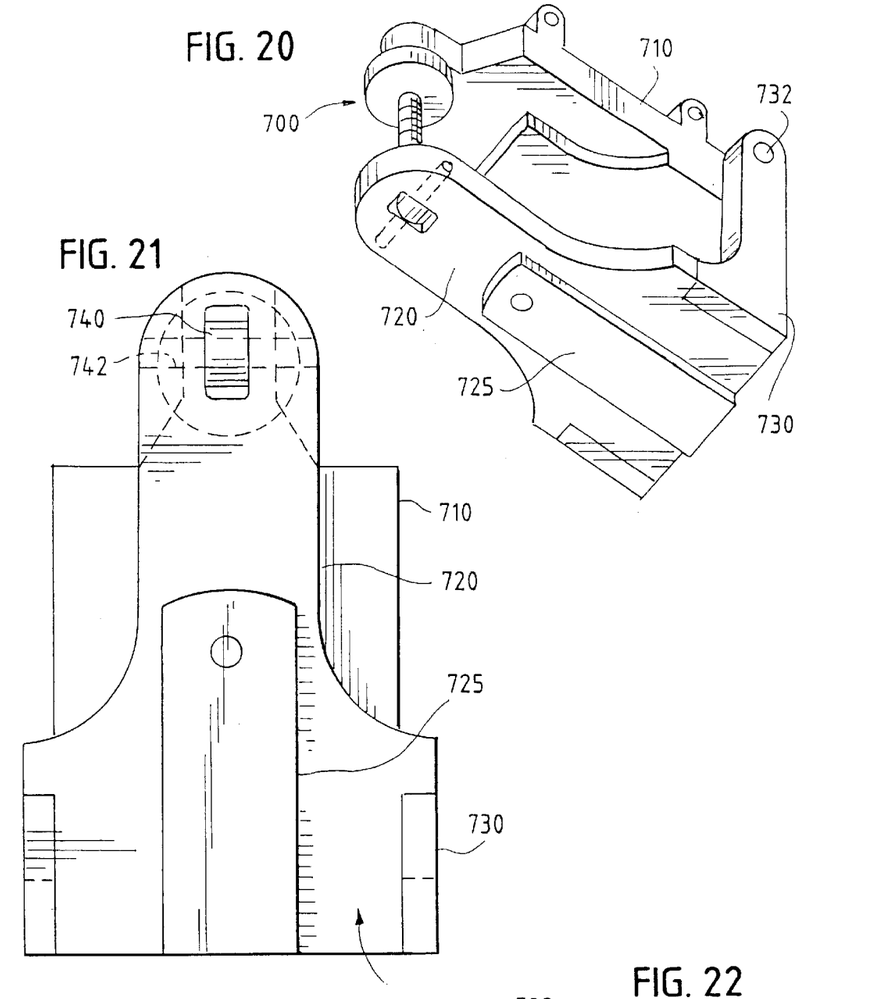
FIG. 20 is a perspective view of a seat support according to another embodiment of the invention.
FIG. 21 is a bottom view of the seat support of FIG. 20.
Figure 22:
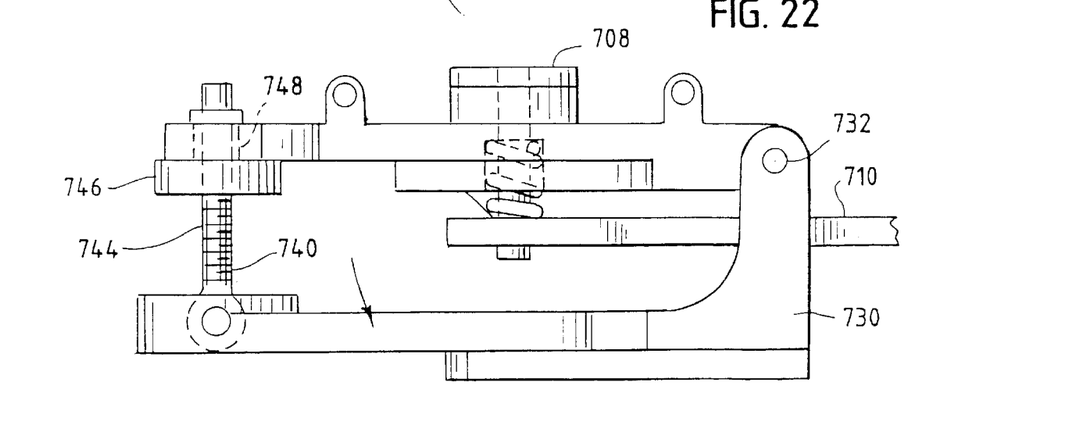
FIG. 22 is a side view of the seat support of FIG. 20.

FIGS. 20 through 22 illustrate another embodiment of a seat support according to the present invention. The seat support 700 comprises a top portion, or seat platform 710, and a bottom portion, or base member 720. The seat platform 710 is similar to those described above, having a lock block 708 and a lock lever 710 for locking a bicycle seat in place. The lock block 708 and the lock lever 710 are not shown in FIGS. 20 through 21 for simplicity. The base member 720 has an interface 725 for engaging the exercise bike or other apparatus. The interface 725 may be similar to those described above or may be adapted to accommodate a specific bicycle design. The back portions of the seat platform 710 and the base member 720 are each connected to hinge members 730 on each side. In the embodiment illustrated in FIGS. 20 through 22, the hinge members 730 are connected to the seat platform 710 by pins 732, thus allowing the seat platform to pivot relative to the base member 720. The pivoting is enabled by a tilt adjustment mechanism such as those described above or that illustrated in FIGS. 20 through 22. The tilt adjustment mechanism illustrated in FIGS. 20 through 22 comprises a clevis 740 connected to the front portion of the base member 720. A circular boss of the clevis 740 is connected to the base member 720 by a pin 742. The clevis 740 has a threaded shaft 744 which is inserted through a tilt adjustment mechanism connected to the seat platform 710. The tilt adjustment mechanism comprises a tilt adjustment knob 746 and a threaded sleeve 748, similar to threaded sleeve 614 and tilt adjustment knob 612 described above with reference to FIGS. 16 through 19.

Figure 23:
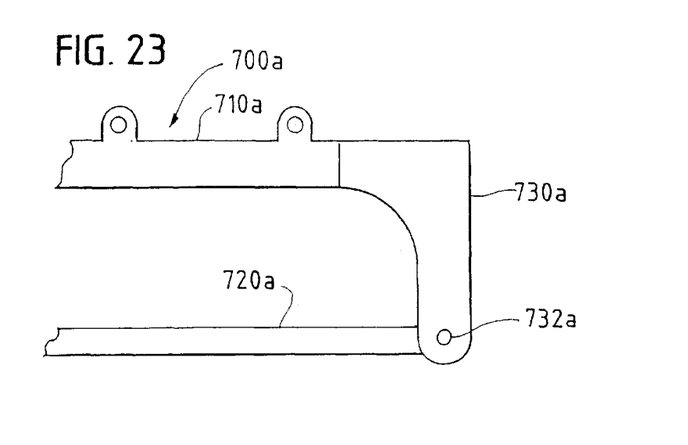
FIG. 23 is a side view of a seat support according to another embodiment of the invention.
Figure 24:
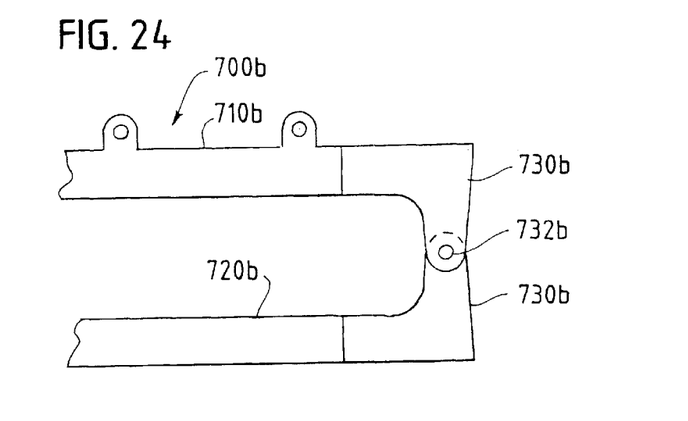
FIG. 24 is a side view of a seat support according to another embodiment of the invention.
Figure 25:
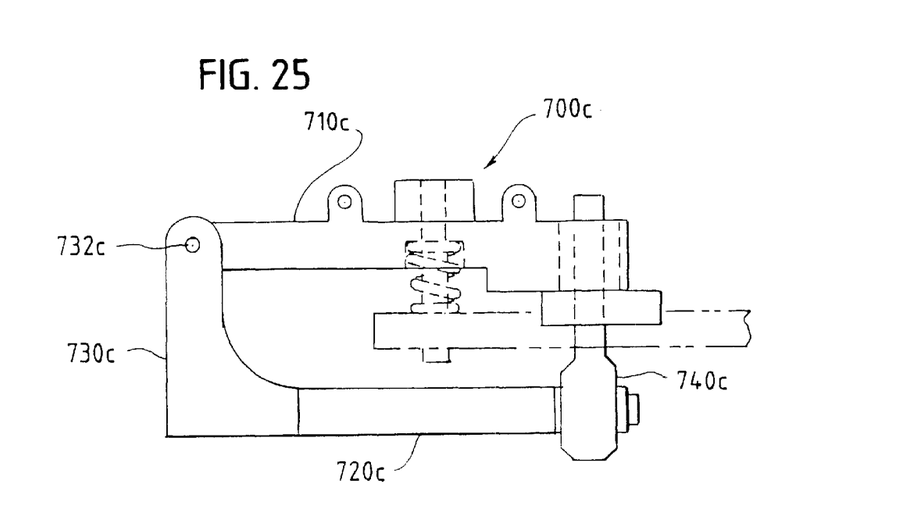
FIG. 25 is a side view of a seat support according to another embodiment of the invention.

FIGS. 23 through 25 illustrate example variations of the embodiment illustrated in FIGS. 20 through 22. In FIG. 23, the seat support 700a has a seat platform 710a, a base member 720a and hinge members 730a. In contrast to the embodiment illustrated in FIGS. 20 through 22, the embodiment illustrated in FIG. 23 comprises hinge members 730a that are connected to the base member 720a by pins 732a. Thus, the pivot point is located at the end of the base member 720a rather than the seat platform.

FIG. 24 illustrates a similar seat support as to that described above in the embodiments of FIGS. 20 through 23. However, the embodiment illustrated in FIG. 24 comprises a two-piece hinge member 730b. The two pieces of the hinge member 730b are connected to each other at approximately a mid point between the seat platform 710b and the base member 720b. The two pieces of the hinge member 730b are connected by a pin allowing the two pieces to pivot with respect to each other, thereby allowing the seat platform 710b and the base member 720b to pivot relative to each other.

FIG. 25 illustrates yet another variation of the embodiments illustrated in FIGS. 20 through 24. The embodiment illustrated in FIG. 25 comprises a hinge member 730c that is located at the front portion of the base member 720c and the seat platform 710c. In this embodiment, the tilt adjustment mechanism is located at the rear of the seat support 700c. Further, in this embodiment, the clevis 740c is connected to the base member 720c by a longitudinal bolt extending through the base member 720c.

Figure 26:
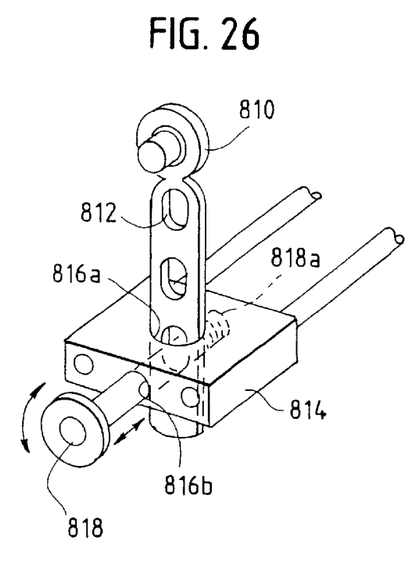
FIG. 26 is a perspective view of a pitch adjustment system according to an embodiment of the invention.

FIGS. 26 through 32 illustrate variations of the tilt control mechanism described above. FIG. 26 illustrates a tilt control mechanism comprising a post member 810 with a series of apertures 812. A base portion 814 is provided with a vertical through hole 816a for accommodating the shaft of the post member 810. One end of the post member 810 is fixed relative to a seat platform. Alternatively, the post member 810 may be fixed to the base member and the adjusting portion may be on the seat platform. The base portion 814 is also provides with a horizontal bore 816b which is perpendicular to and crosses the vertical through hole 816a. A back portion of the horizontal bore 816b is internally threaded to accommodate a fastener.

A locking knob 818 has a shaft that is sized to fit through the horizontal bore 816b and has a threaded portion 818a for engaging the internally threaded back portion of the horizontal bore 816b. Thus, to adjust the tilt of the bike seat, the locking knob 818 may be rotated to unfasten it from the horizontal bore 816b and may be removed. Once the locking knob 818 has been removed, the post member 810 may be adjusted up or down to align a different aperture 812 with the horizontal bore 816b. Then, the tilt position may be locked by reinserting the locking knob 818 through the horizontal bore 816b and securing it to the threaded portion.

Figure 27A:
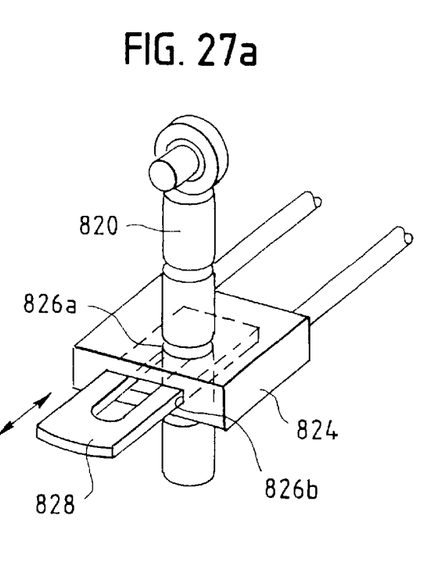
FIG. 27a is a perspective view of a pitch adjustment system according to another embodiment of the invention.
Figure 27B:
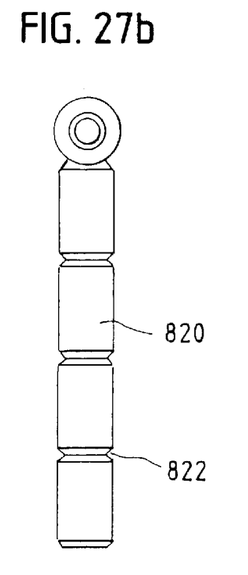
Figure 27C:
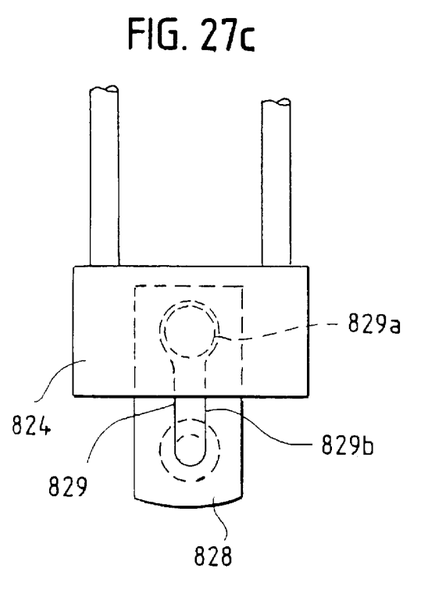

FIGS. 27a–c illustrate another embodiment of a tilt control mechanism. The tilt control mechanism comprises a post member 820 with a plurality of spaced apart notches 822 provided along the shaft of the post member 820. A base portion 824 is provided with a vertical through hole 826a through which the post member 820 can be inserted. The base portion 824 is also provided with a horizontal channel 826b which is perpendicular to and intersects with the vertical through hole 826a. The horizontal channel 826b is sized to accommodate a locking key 828 therein. The locking key 828 can be slid in and out of the horizontal channel 826b.

The locking key 828 has an opening 829 with an enlarged portion 829a and a narrowed portion 829b. In an unlocked position, the locking key 828 is positioned such that the enlarged portion 829a of the opening 829 coincides with the vertical through hole 826a and the shaft of the post member 820. The enlarged portion 829a is large enough to allow the entire shaft to slide therethrough. In the locked position, the locking key 828 is positioned such that the narrowed portion 829b is coincident with the vertical through hole 826a. The narrowed portion is sized such that only the notches 822a can be accommodated therein, while the remainder of the shaft of the post member 820 cannot slide therethrough. Thus, when the tilt requires adjusting, the key 828 is moved to the unlocked position, and the post member 820 is adjusted to the desired tilt position. Once a desired notch is aligned with the plane of the locking key 828, the locking key 828 is moved into the locked position, thereby preventing any further movement of the post member 820.

Figure 28:
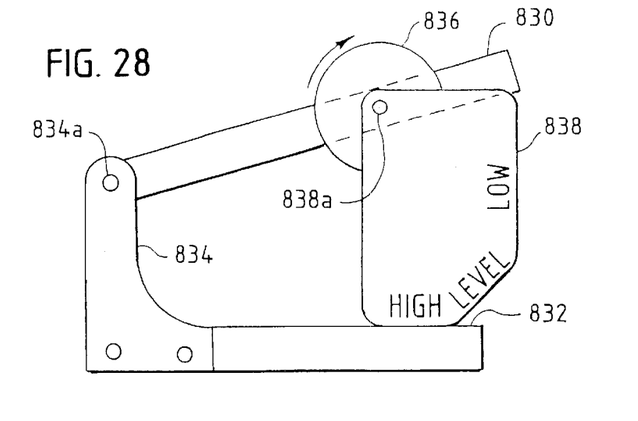
FIG. 28 is a side view of a pitch adjustment system according to another embodiment of the invention.

FIG. 28 illustrates yet another embodiment of a tilt control mechanism according to the present invention. A seat support is provided with a top portion 830, a bottom portion 832, and a hinge member 834. The hinge member 834 has a pivot point 834a about which the top portion may pivot.

The tilt control mechanism comprises an adjustment knob 836 and an adjusting block 838. The adjustment knob 836 is a circular knob connected to the top portion 830. The adjusting block 838 may be integral with the adjustment knob 836. The adjusting block 838 is shaped to have varying lengths from a hinge point 838a and an end away from the adjustment knob 836. Thus, as the adjustment knob 836 is rotated, a different portion of the adjusting block 838 contacts the bottom portion 832. In this manner, the height of the hinge point 838a relative to the bottom portion is varied and the tilt of the bike seat may be adjusted.

Figure 29:
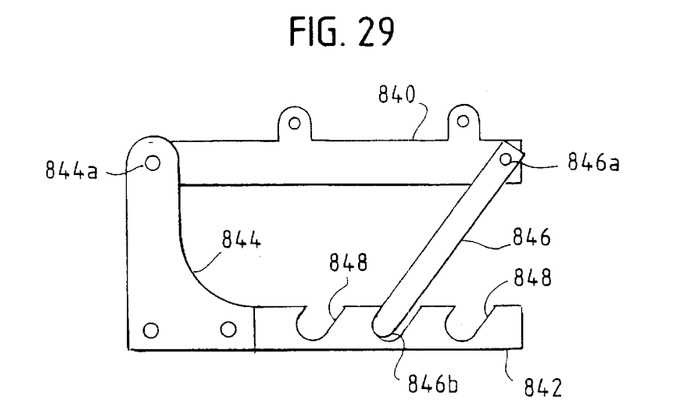
FIG. 29 is a side view of a pitch adjustment system according to another embodiment of the invention.

FIG. 29 illustrates yet another embodiment of a tilt control mechanism according to the present invention. A seat support has a top portion 840, a bottom portion 842 and a hinge member 844. The hinge member has a pivot point 844a about which the top portion 840 may pivot. A tilt support member 846 is connected to the top portion 840 at a hinge point 846a. The hinge point 846a is near the opposite end of the top portion 840 from the pivot point 844a. The tilt support 846 has a free end 846b that is opposite from the hinge point 846a. The bottom portion 842 is provided with a plurality of spaced-apart grooves 848. The grooves accommodate the free end 846b of the tilt support 846. Each one of the spaced apart grooves 848 corresponds to a different tilt level for the top portion 840 relative to the bottom portion 842.

Figure 30A:
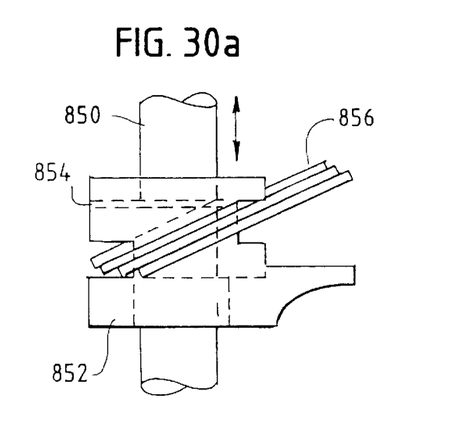
FIG. 30a is a side view of a pitch adjustment system according to another embodiment of the invention.
Figure 30B:
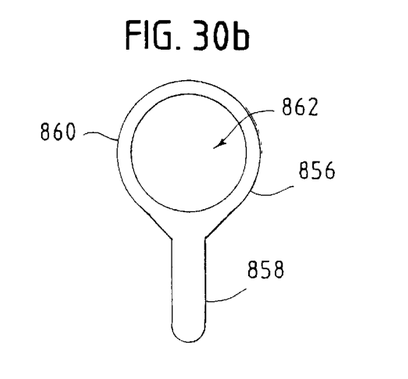

FIGS. 30a and 30b illustrate another embodiment of a tilt control mechanism according to the present invention. The tilt control mechanism comprises a post member shaft 850 and an adjustment housing 852. The adjustment housing 852 has a through hole through which the post member shaft 850 is inserted. A V-shaped biasing spring 854 is provided within the housing 852. The biasing spring 854 acts on a series of tabs 856 provided within the housing 852 and surrounding the post member shaft 850.

A tab 856 is more clearly illustrated in FIG. 30b. The tab 856 comprises a handle portion 858 and a ring portion 860. The ring portion forms an opening 862 large enough to accommodate the cross section of the post member shaft 850. Referring now to FIG. 30a, when the handle portion 858 of the tabs 856 is pressed downward against the force of the biasing spring 854, the opening 862 lines up with the cross section of the post member shaft 850, thereby allowing the post member shaft 850 to slide in a vertical direction. When the handle 858 of the tabs 856 is released, the biasing force of the biasing spring 854 causes the tabs 856 to return to the angled position illustrated in FIG. 30a. In this position, the ring portion 860 of the tabs 856 frictionally engages the shaft 850, thereby preventing it from sliding and locking it in position. In this manner, the position of the shaft relative to the adjustment housing 852 and, therefore, the tilt position of the bike seat may be adjusted.

While the invention has been described with reference to only a limited number of embodiments, it will be appreciated that, given the preceding disclosure and knowledge of the principles upon which the invention is based, be able to make various changes and modifications without departing from the scope of the invention which is limited only by the appended claims.

What is claimed is:

1. A seat mounting base, comprising:
   a top portion adapted to receive a seat, said top portion having a front portion and a back portion;
   a bottom portion for supporting said top portion, said bottom portion having a front portion and a back portion;
   a front post member connecting said front portion of said top portion to said front portion of said bottom portion;
   a rear post member connecting said back portion of said top portion to said back portion of said bottom portion;
   tilting means for adjusting a substantially forward-to-rearward tilt angle between said top portion and said bottom portion;
   an adjustment device for causing said tilt means to move to an adjusted portion to raise or lower either the front portion or the back portion; of the top portion relative to the bottom portion;
   said adjustment device for securing said tilt means in an adjusted position;
   wherein said tilting means further comprises:
     a shaft portion of at least one of said front post member and said rear post member, said shaft portion having a series of notches; and
     a locking key having an opening therethrough, said opening having an enlarged portion larger than a cross-section of said shaft portion and a narrowed portion smaller than a cross-section of said shaft portion and larger than a cross-section of said series of notches, said locking key being adapted to slidably engage one of said top portion and said bottom portion to selectively align one of said enlarged portion and said narrow portion with said shaft portion for adjustably securing said shaft portion.

2. The seat mounting base according to claim 1, further including:
   a rotatable lock block mounted on an upper surface of said top portion;
   a lever connected to said lock block mounted on a lower surface of said top portion; and
   spring means mounted between said lever and said lower surface of said top portion, said spring means adapted to force said lock block against a pair of elongate members of the seat to secure said seat to said top portion.

3. The seat mounting base according to claim 1, wherein said top portion is adapted to pivot side-to-side relative to said bottom portion.

4. The seat mounting base according to claim 3, further comprising a pair of springs provided between said top portion and said bottom portion, said pair of springs adapted to resist pivoting of said top portion relative to said bottom portion.

5. The seat mounting base according to claim 4, wherein said pair of springs are compression springs.

6. The seat mounting base according to claim 4, wherein said top portion and said bottom portion have recesses adapted to accommodate said pair of springs.

7. The seat mounting base according to claim 1, wherein said top portion is narrowed relative to said bottom portion of said top portion.

8. The seat mounting base according to claim 1, wherein said front post member and said rear post member are connected to said top portion by ball joints.

9. The seat mounting base according to claim 1, further comprising;
   a rotatable lock block mounted on an upper surface of said top portion;
   a lever connected to said lock block mounted on a lower surface of said top portion; and spring means mounted between said lever and said lower surface of said top portion.

10. The seat mounting base according to claim 1, wherein said top portion has an upper surface for receiving a seat having a pair of elongate members, said upper surface having longitudinal grooves for accommodating said elongate members therein.

11. The seat mounting base, according to claim 11, further including
hinge means connecting the other of said front portion and said back portion.

12. The seat mounting base according to claim 11, wherein said hinge means comprises:
a pair of hinge plates mounted to said bottom portion; and
a pair of pins, each of said pins pivotably connecting one of said pair of hinge plates to said top portion.

13. The seat mounting base according to claim 11, wherein said hinge means comprises:
a pair of hinge plates mounted to said top portion; and
a pair of pins, each of said pins pivotably connecting one of said pair of hinge plates to said bottom portion.

14. The seat mounting base according to claim 11, wherein said hinge means comprises:
a pair of hinge members, each hinge member comprising a first hinge element mounted to said top portion and a second hinge element mounted to said bottom portion, said first hinge element and said second hinge element being pivotably connected to each other by a pin.

* * * * *